United States Patent [19]

Rothen et al.

[11] Patent Number: 4,671,578
[45] Date of Patent: Jun. 9, 1987

[54] FLUID PRESSURE RESPONSIVE BRAKE FOR THE TRAILER OF A VEHICLE

[75] Inventors: Johann Rothen, Sarstedt; Manfred Schult, Garbsen, both of Fed. Rep. of Germany

[73] Assignee: WABCO Westinghouse Fahrzeugbremsen GmbH, Hanover, Fed. Rep. of Germany

[21] Appl. No.: 854,276

[22] Filed: Apr. 21, 1986

[30] Foreign Application Priority Data

Apr. 25, 1985 [DE] Fed. Rep. of Germany ....... 3514949

[51] Int. Cl.⁴ .............................................. B60T 13/66
[52] U.S. Cl. .......................................... 303/15; 303/7; 303/9
[58] Field of Search .................. 188/3 R, 3 H, 112 R; 303/3, 7, 8, 9, 15, 20, 63, 92, 103

[56] References Cited

U.S. PATENT DOCUMENTS 3,884,529 5/1975 Schlamann et al. .................... 303/7
3,982,792 9/1976 Nakajima ............................ 303/9 X
3,985,395 10/1976 Watanabe ................................ 303/7

Primary Examiner—Duane A. Reger
Attorney, Agent, or Firm—J. O. Ray, Jr.

[57] ABSTRACT

A fluid pressure responsive brake system for the trailer of a vehicle. The brake system includes a trailer supply circuit, which can be connected with the supply circuit of the tractor and which can be connected with an electrical trailer brake circuit, which is connected with the brake system emitting electrical brake signals and the electrical feed of the tractor. There is an electro-fluidic switching apparatus with an OR circuit, by means of which and in connection with an electronic control unit of the trailer, the brakes of the trailer are set if the trailer brake system is separated from the supply circuit of the tractor and/or from the electrical brake signals or the power supply of the tractor.

11 Claims, 2 Drawing Figures

FLUID PRESSURE RESPONSIVE BRAKE FOR THE TRAILER OF A VEHICLE

BACKGROUND OF THE INVENTION

The present invention relates, in general, to fluid pressure responsive brake systems and, more particularly the invention relates to a pneumatic or hydraulic brake for the trailer of a vehicle.

One particular type of such a brake system is described by German Patent DE-OS No. 32 07 793. This prior art type of brake system is controlled both pneumatically and electrically.

The pneumatic control is exercised by the brake circuit of the motor vehicle via a connectable trailer brake line, which is connected with the control input of a trailer brake valve. Connected in parallel to the pneumatic brake force regulation of the trailer brake, the electrical control is exercised by means of a pressure sensor, which measures the brake control pressure in the trailer brake line. The brake pressure, converted by the pressure sensor into an electrical signal, is conducted to electrically regulated pressure control valves which correspond to the respective brake cylinders.

It is known that this electrical signal can be modified by means of an electrical control unit connected in the trailer brake system by electrical signals from axle load and/or wheel speed sensors, for example. In addition, an electrical control signal can be transmitted to the trailer brake circuit via an additional electrical line if desired; such a control signal could be produced, for example, by the tractor brake pedal.

In spite of the above-mentioned types of electrical controls of the trailer brake circuit, an essential feature in this installation is the capability of a redundant pneumatic transmission of the brake pressure, because if there is an interruption in the electrical feed, e.g., if the trailer separates from the tractor, or while the tractor is parked with the trailer connected, the electrical system would generally become ineffective. The braking of the trailer in these cases is necessary and is exercised via the pneumatic brake circuit, in which, when the trailer brake line and/or trailer reservoir is vented, there can be a pressurization of the brake cylinder, i.e., a setting of the trailer brake, by the trailer reservoir via the reversed trailer brake valve.

A setting of the brakes with a trailer brake circuit not receiving electrical power, so that the pressure control valves would place the reservoir circuit in communication with the feed cylinders, would result during travel in an undesirable sudden braking of the trailer. A braking action reduced for this special case, e.g., by the use of a throttle between the pressure control valves and the brake cylinder, would be impermissible, because then the service braking action would also be throttled.

SUMMARY OF THE INVENTION

The present invention teaches a fluid pressure responsive brake system for the trailer portion of a tractor-trailer vehicle. The trailer brake system is designed such that the brakes of the trailer are set if the trailer brake system should be separated from the supply circuit of the tractor and/or from the electrical brake signals on the power supply of the tractor. The trailer brake system includes a trailer fluid pressure supply circuit which can be connected with the tractor fluid supply circuit. The trailer fluid supply circuit can also be connected to a trailer electrical brake circuit. The trailer electrical brake circuit is connectable to the brake system emitting brake signals and the electrical feed of the tractor. To accomplish the setting of the trailer brakes under the conditions described above, there is an electro-fluidic switching apparatus with an OR circuit.

OBJECTS OF THE INVENTION

It is, therefore, one of the objects of the invention to improve a trailer brake system so that, in the absence of at least one of the electrical braking or control signals from the tractor, and in the absence of the power supply in the trailer, the trailer brakes can be placed in the braking position from the tractor.

Another object of the invention is to provide a trailer brake system that, even with an electrical trailer brake system without a pneumatic brake line between the tractor and the trailer, there is an automatic application of the trailer brakes if the electrical connection between the tractor and the trailer is cut.

Still another object of the invention is to provide a trailer brake system such that, if the electrical power supply to the trailer brake system originates from a current source (battery) in the trailer, control signals can also be given via the signal line between the tractor and the trailer, which report the electrical connection between the tractor and the trailer and are evaluated on the trailer.

These and various other objects and advantages of the present invention will become more readily apparent to those persons skilled in the motor vehicle braking art from the following more detailed description when such description is taken in conjunction with the attached drawings and the appended claims.

BRIEF DESCRIPTION OF THE INVENTION

Figure 1:
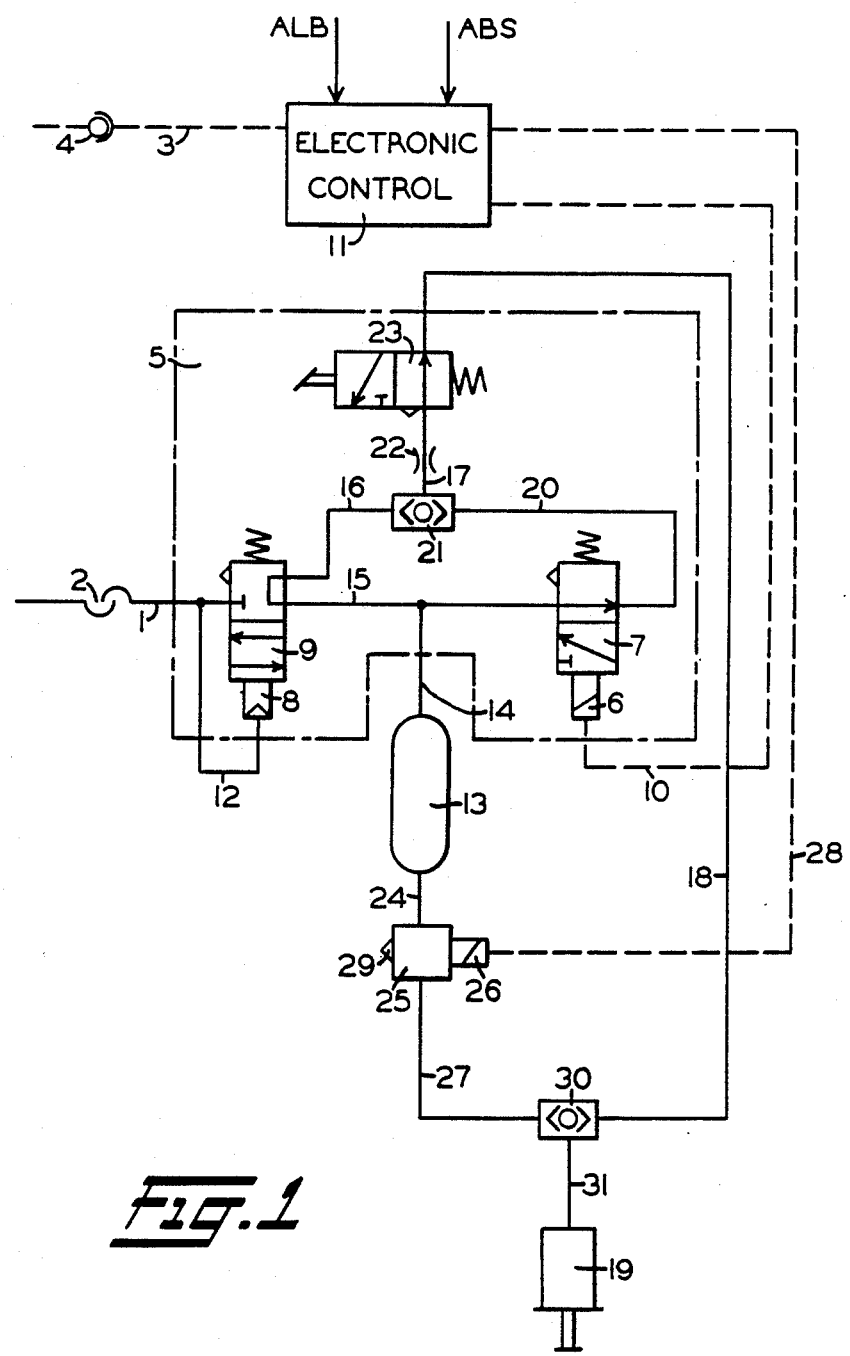
FIG. 1 diagrammatically illustrates the circuit of an electrically controlled trailer brake system with a circuit which includes an electrical and a pneumatic control input, constructed according to the principles of the present invention.

Now refer more particularly to FIG. 1, which illustrates an electro-fluidic supply circuit, which is preferably either pneumatic or hydraulic, and an electrical brake circuit of a trailer brake system. The pneumatic or hydraulic supply circuit is in fluid communication via a fluid pressure medium line 1 and a line fluid pressure coupling 2 with the fluid pressure medium supply circuit of the tractor. The electrical brake circuit of the trailer is in communication via an electrical signal line 3 and an electrical coupling 4 with the electrical portion of the brake system of the tractor which emits electrical braking control signals. The electrical portion of the trailer brake system is preferably fed by an electrical energy source on the tractor. A valve circuit 5 with an electrical control connection 6 of a multi-way valve 7 and a pneumatic control connection 8 of a multi-way valve 9 is located in the pneumatic pressure medium feed circuit. The electrical control connection 6 can be put in communication via an electrical line 10 with an electronic control unit 11, which is in communication via the electrical signal line 3 with the electrical portion of the brake system emitting the electrical brake control signals and the electrical feed of the tractor. The pneumatic control connection 8 is in communication via fluid pressure medium lines 12 and 1 with the fluid pressure medium supply circuit of the tractor.

The multi-way valve 9, when the control connection 8 is not pressurized, connects a reservoir 13 located in the pneumatic pressure medium supply circuit via lines 14, 15, 16, 17, and 18 with a brake cylinder 19, which is represented symbolically here for all the other brake cylinders of the trailer. When the control connection 8 is pressurized, the multi-way valve 9 connects the fluid pressure medium supply circuit of the tractor via the lines 1, 15, and 14 with the reservoir 13. The line 16 is then vented to the atmosphere.

The multi-way valve 7, when there is no current to the control connection 6, connects the reservoir 13 via the lines 14, 15, 20, 17, and 18 with the brake cylinder 19. When the control connection is carrying current, the connection from the reservoir 13 to the brake cylinder 19 is closed and the line 20 is then vented to the atmosphere.

A shuttle valve 21 located between the lines 16 and 20, acting in the manner of a two-way check valve, always connects the line carrying fluid pressure, or both lines carrying fluid pressure 16 and 20 with the line 17. A throttle located in the line 17 throttles the feed of the fluid pressure medium through the line 18 to the brake cylinder 19.

A manually-operated multi-way valve 23 located between the lines 17 and 18, depending on its position, connects the lines 17 and 18, or closes off the line 17 and connects the line 18 with the atmosphere.

The reservoir 13 is connected via a line 24 with a fluid pressure control valve 25, which is connected via a line 27 with the brake cylinder 19. The fluid pressure control valve 25 includes an electrical control connection 26, by means of which a brake control signal emitted by the electronic control unit 11 via the electrical line 28 can be converted into a fluid pressure emitted by the fluid pressure regulating valve 25 of the fluid pressure medium which can be fed via the line 27 to the brake cylinder 19. When there is no power to the control connection 26, the brake cylinder 19 is connected with the atmosphere via the line 27 with an outlet 29 of the fluid pressure control valve 25. The line 24 coming from the reservoir 13 is then cut off from the line 27.

A double-action check valve 30 located between the lines 27 and 18 always connects the line 27 or 18 carrying fluid pressure via a line 31 with the brake cylinder 19. The brake cylinder 19 can be vented to the atmosphere either via the lines 31 and 27 and the fluid pressure control valve 25, or via the lines 31 and 18 and the valve switching apparatus 5.

The brake signals transmitted from the electronic control unit 11 to the control connection 26 of the fluid pressure control unit 25 can be modified by signals from the trailer which are a function of the load and/or wheel speed, which signals can be fed to the electronic control unit 11. The control connection 6 of the multi-way valve 7, which is fed a switching current by the control unit 11, is either under current or not under current, depending on the operational status of the trailer.

Figure 2:
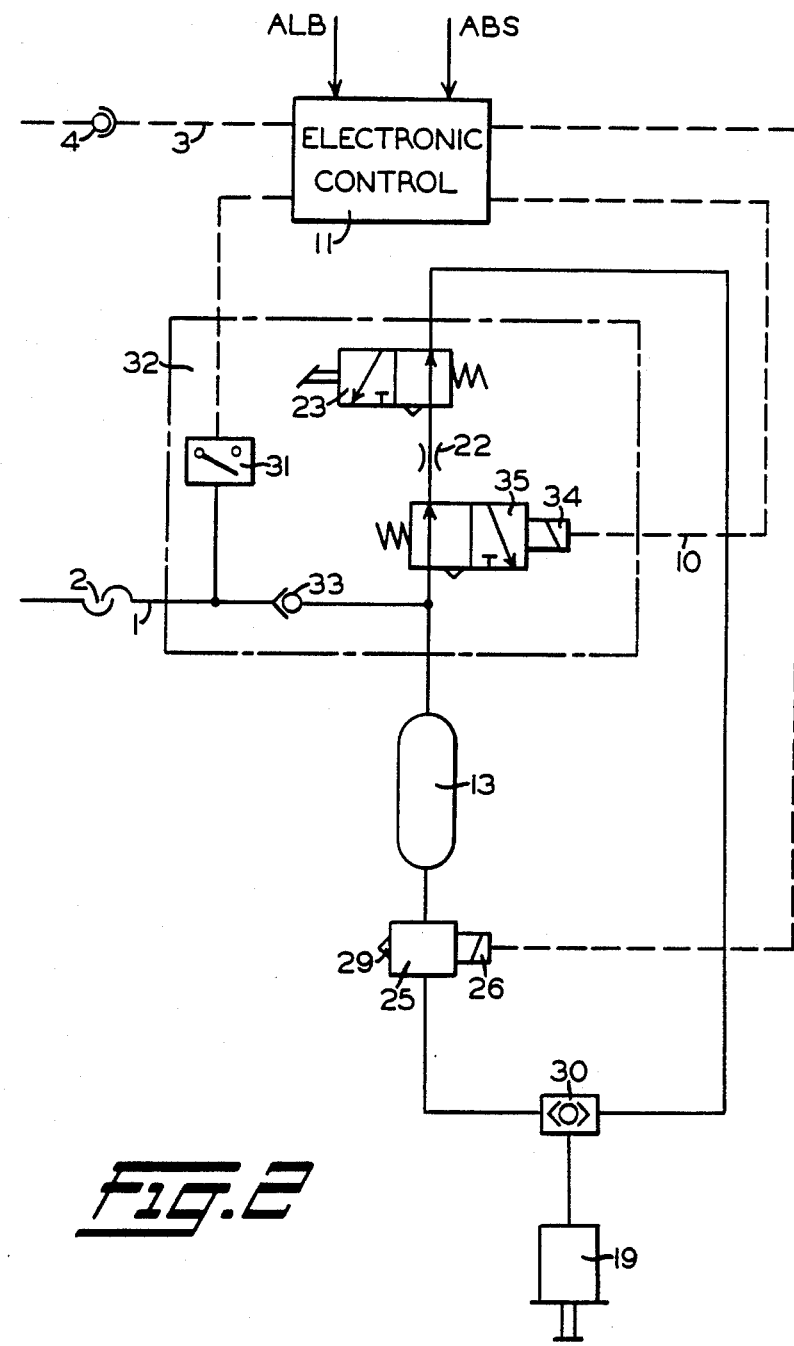
FIG. 2 diagrammatically illustrates a brake system according to FIG. 1 with a circuit which includes an electrical control input and a pressure switch incorporated therein.

FIG. 2 illustrates a valve circuit 32, which differs from the valve circuit illustrated in FIG. 1 in that the pneumatically-controlled multi-way valve 9 is used by means of a pneumatic/electrical switch 31 in combination with a check valve 33. The switch 31 reacts to a fluid supply pressure present in the fluid pressure medium line 1 so that an electrical control signal is fed to the electronic control unit 11. From the electronic control unit 11, an electrical current is then conducted via the electrical line 10 to the electrical control connection 34 of a multi-way valve 35, whereby the multi-way valve 35 assumes a position in which the connection from the reservoir 13 to the brake cylinder 19, as described with reference to FIG. 1, is closed off. The check valve 33, when the coupling 2 is interrupted or in the parked position of the tractor, closes off the fluid pressure medium supply circuit of the trailer from the atmosphere.

The electronic control unit 11 includes a monitor circuit by means of which the control input 6 and 34 of the valve circuitry 5 and 32 is connected with the electrical signal line 3 and/or with the electrical feed line.

The operation of the system illustrated in FIG. 1 is as follows:

When the vehicle is moving, the fluid pressure responsive braking system of the trailer is connected via the coupling 2 and 4 with the braking system of the tractor. When the fluid supply pressure prevails in the line 1, the multi-way valve 9 assumes a position in which the reservoir 13 is filled via the lines 1, 15, and 14 with a specified fluid supply pressure. By means of the electronic control unit 11, a current is fed to the control connection 6 of the multi-way valve 7, whereupon the multi-way valve 7 assumes a position in which the line 15 is cut off from the lines 20, 17, and 18.

The electronic control unit 11 receives braking control signals from the braking system of the tractor, which act as the braking current via the line 28 and the control connection 26, causing the fluid pressure control valve 25 to conduct an appropriately modulated brake pressure from the reservoir 13 via the connection 24, 27, 30, and 31 to the brake cylinder 19. The lines 16, 17, and 20 are connected via the multi-way valves 7 and 9 with the atmosphere when the vehicle is in operation.

When the coupling 2 is interrupted, the lines 1 and 12 are vented to the atmosphere. The multi-way valve 9 thereupon assumes a position in which the reservoir 13 is connected via the connection 14, 15, 9, 16, 21, 17, 23, 18, 30, and 31 with the brake cylinder 19.

When the coupling 4 is interrupted, i.e., when there is an interruption of the brake control signal emitted by the tractor and/or when there is an interruption of the electrical feed from the tractor to the trailer, the control connection 6 of the multi-way valve 7 loses the current supplied by the control connection 6 of the multi-way valve 7. The multi-way valve 7 then assumes a position in which the reservoir is in communication via the connection 14, 15, 7, 20, 21, 17, 23, 18, 30, and 31 with the brake cylinder 19.

In both cases, i.e., when the couplings 2 or 4 are interrupted, the brakes of the trailer are fixed by the connection of the reservoir 13 with the brake cylinder 19. This also occurs if both couplings 2 and 4 are interrupted, since then the reservoir 13 is in communication with the brake cylinder 19 via the connection 14, 15, 16 and 20, 21 and 17, 18, 30, and 31.

The throttle 22 located in the line 17 delays the fluid pressure accumulation in the brake cylinder 19. This prevents a sudden braking of the trailer if, while the vehicle is in motion, there is a failure of the power supply from the tractor to the trailer.

In the parked position, i.e., when the couplings 2 and 4 are disconnected, but the tractor is standing still, the brakes of the trailer are also set, if there is no electrical feed from the tractor.

As shown in FIG. 2, the brakes of the trailer are also set under the operating conditions described. This also occurs if the line 1 is vented when the electrical switch 31 interrupts the control signal feed to the electronic control unit 11 and thereby removes the current from the control connection 34 of the multi-way valve 35. The multi-way valve 35 then assumes a position in which the reservoir 13 is connected with the brake cylinder 19.

When the brake control signal emitted from the tractor is interrupted or if there is an absence of electrical feed from the tractor, the control connection 34 of the multi-way valve 35 also receives no power.

The brakes set by the valves 7, 9, and 35 can be released by a manual activation of the multi-way valve 23. The brake cylinder 19 is thereby vented to the atmosphere via the connection 31, 30, 18, and 23. The trailer can then be marshalled when unconnected.

While presently preferred embodiments of the invention have been described in detail, various other modifications and adaptations can be made by those persons skilled in the motor vehicle braking art without departing from the spirit and scope of the appended claims.

We claim:
1. A fluid pressure responsive brake system for the trailer of a vehicle, said brake system comprising:
   (a) a trailer supply circuit operatively connected to a pressure medium reservoir, said reservoir being connectable via a pressure medium line and a pressure medium coupling with a pressure medium supply circuit of a tractor brake system;
   (b) a trailer electrical brake circuit, connectable via an electrical signal line and at least one of an electrical coupling and an electrical supply line with said braking system of said tractor emitting electrical braking signals;
   (c) said trailer electrical braking circuit including an electronic control unit to control brake pressure by an electrically-controlled pressure control valve device;
   (d) brake cylinders corresponding to each wheel brake which can be vented to atmosphere by said pressure control valve device of said trailer brake circuit;
   (e) a valve switching means located in said trailer pressure medium supply circuit for connecting said pressure medium reservoir of said trailer supply circuit with said wheel brake cylinders;
   (f) means for connecting said valve switching means with said pressure medium supply circuit of said tractor;
   (g) said valve switching means when there is a separation of said trailer brake system from said pressure medium supply circuit of said tractor, connecting said pressure medium reservoir of said trailer supply circuit with said wheel brake cylinders;
   (h) a control input of said valve means connected via a monitoring circuit with at least one of an electrical signal line and a feed line;
   (i) said valve switching means, when there is an interruption of at least one of said electrical signal line and said brake signals and said feed line of said electrical feed, connects said pressure medium reservoir of said trailer supply circuit with said brake cylinders.

2. A fluid pressure responsive brake system, according to claim 1, wherein:
   (a) said valve switching apparatus includes a control connection to recognize the presence and absence of at least one of said electrical brake control signals and said electrical feed between said tractor and said trailer; and
   (b) said control connection is connected via an electrical line and said monitor circuit with at least one of said electrical signal line and said feed line.

3. A fluid pressure responsive brake system, according to claim 1, wherein said valve switching means includes a pressure switch which at a specified pressure in said pressure medium line transmits an electrical signal to said electronic control unit.

4. A fluid pressure responsive brake system, according to claim 1, wherein said valve switching means includes a throttle for controlling flow of pressure medium from said pressure medium reservoir via said valve switching means to said wheel brake cylinders.

5. A fluid pressure responsive brake system, according to claim 1, wherein said valve switching means includes a manually activated multi-way valve which in a first position creates a passage from said valve switching means to said wheel brake cylinders, and in a second position connects said wheel brake cylinders with atmosphere.

6. A fluid pressure responsive brake system, according to claim 1 wherein said valve switching means includes a check valve which cuts off at least one of said supply circuit of said trailer from said supply circuit of said tractor and said atmosphere.

7. A fluid pressure responsive brake system, according to claim 1, wherein:
   (a) said valve switching means includes a pneumatic shuttle valve connected with a first input via a pneumatically controllable multi-way valve and with a second input via an electrically controllable multi-way valve with said pressure medium reservoir; and
   (b) said shuttle valve includes an output connected via a manually operated multi-way valve with said brake cylinder.

8. A fluid pressure responsive brake system, according to claim 7, wherein said multi-way valve connects said pressure medium supply circuit of said trailer with said pressure medium reservoir when a control connection is pressurized, and said pressure medium reservoir with said brake cylinder when said control connection is unpressurized.

9. A fluid pressure responsive brake system, according to claim 1, wherein valve switching means includes a multi-way valve with an electrical control connection, which connects said pressure medium reservoir with said brake cylinder in the absence of current fed to it, and said brake cylinder with said atmosphere when current is fed to said control connection.

10. A fluid pressure responsive brake system, according to claim 3, wherein said valve switching means includes a multi-way valve with an electrical control connection which connects said pressure medium reservoir with said brake cylinder in an absence of current, and closes said connection when said control connection receives a current.

11. A fluid pressure responsive brake system, according to claim 6, wherein said valve switching means includes a multi-way valve with an electrical control connection which connects said pressure medium reservoir with said brake cylinder in an absence of current, and closes said connection when said control connection receives a current.

* * * * *